United States Patent [19]

Meckel et al.

[11] 4,015,320
[45] Apr. 5, 1977

[54] ROLLER FOR THE PRESSURE TREATMENT OF WEBS OF GOODS

[75] Inventors: Werner Meckel, Nienhagen; Werner Kilian, Wettbergen, both of Germany

[73] Assignee: Continental Gummi-Werke Aktiengesellschaft, Hannover, Germany

[22] Filed: May 17, 1976

[21] Appl. No.: 686,948

[30] Foreign Application Priority Data

May 15, 1975 Switzerland .................. 006242/75

[52] U.S. Cl. ............................... 29/130; 29/132
[51] Int. Cl.² ................................. B21B 31/08
[58] Field of Search .......... 29/132, 131, 130, 129.5

[56] References Cited

UNITED STATES PATENTS

| 700,125 | 5/1902 | Kempshall | 29/130 X |
|---|---|---|---|
| 1,803,357 | 5/1931 | Robins | 29/131 X |
| 1,997,442 | 4/1935 | Walsh | 29/130 X |
| 2,369,635 | 2/1945 | Bacon | 29/130 |
| 2,442,333 | 6/1948 | Bacon | 29/130 X |
| 2,597,858 | 5/1952 | Freedlander | 29/132 X |

FOREIGN PATENTS OR APPLICATIONS

| 24,132 | 1/1914 | Norway | 29/130 |
|---|---|---|---|
| 651,969 | 4/1951 | United Kingdom | 29/131 |
| 844,817 | 8/1960 | United Kingdom | 29/130 |

*Primary Examiner*—Alfred R. Guest
*Attorney, Agent, or Firm*—Walter Becker

[57] ABSTRACT

A roller for the pressure treatment of webs of goods with a rigid roller core and a hose-shaped roller mantle of rubber or rubber-like material with reinforcing inserts, in which the reinforcing inserts include a monofile coil of a strong substantially non-extensible material e.g. a metallic material or a highly strong synthetic material and extending over the length of said roller mantle. The reinforcing inserts furthermore include two layers of rectilinear thread-shaped strength carriers which extend substantially in the axial direction of the roller in mutually spaced parallel arrangement while being distributed in the circumferential direction of the roller and extending over the length thereof. These two layers of rectilinear strength carriers are respectively located on radially opposite sides of the monofile wire coil.

9 Claims, 2 Drawing Figures

ROLLER FOR THE PRESSURE TREATMENT OF WEBS OF GOODS

The present invention relates to rollers for the pressure treatment of webs of goods with a rigid roller core and a hose-shaped roller mantle or sleeve of rubber or rubber-like materials with reinforcing inserts embedded therein.

Elastomeric covers for rollers intended for the processing of papers or textiles or for rotary printing machines and similar purposes, are, when in use, subjected to the continuous effect of various forces, primarily to a radially directed pressure and to pushing or shearing forces originating from frictional contact. Therefore, such elastomeric covers have the tendency to deform to a corresponding effect. These deformations at any rate affect the precision of the end product. While this danger is in more or less pronounced form present always, it exists particularly when the deformable roller mantle bridges greater axial unsupported spaces over the roller core and is supported with respect thereto by a pressure medium. A corresponding stiffening of the roller mantle is, therefore, of great importance for a proper functional operation of the roller.

It is, therefore, an object of the present invention so to stiffen elastomeric roller covers by new novel built-up reinforcing inserts that regardless of the roller construction, the danger of undesired deformation during the use of the roller will be eliminated.

It is a further object of this invention to provide an elastomeric cover as set forth in the preceding paragraph according to which the elastic properties of the elastomeric material advantageous for the working operation will be maintained to a full extent and can be properly utilized.

These and other objects and advantages of the invention will appear more clearly from the following specification in connection with the accompanying drawing, in which.

Figure 1:
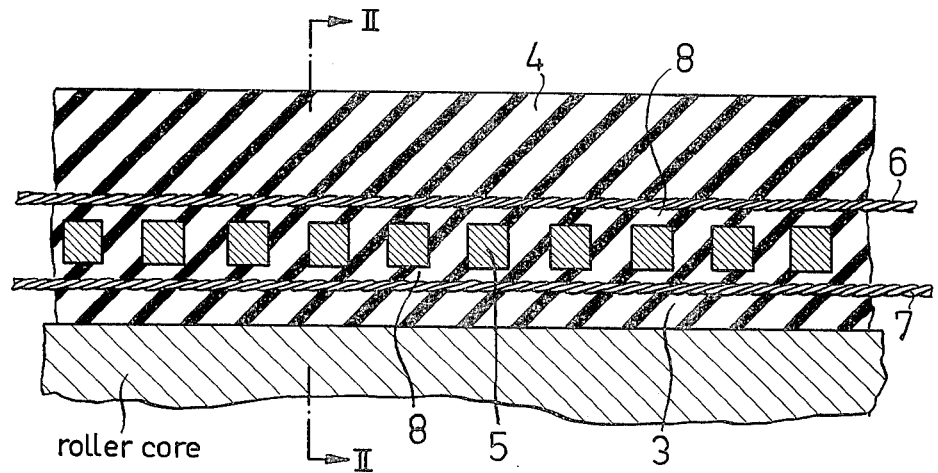
FIG. 1 represents a fragmentary longitudinal section through a roller mantle according to the invention, said section being taken along the ling I—I of FIG. 2.
Figure 2:
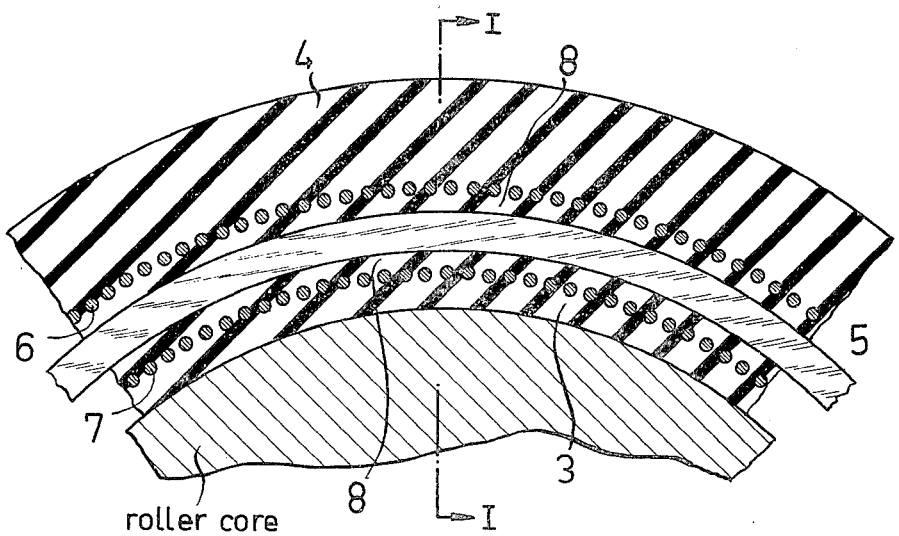
FIG. 2 is a cross section along the line II—II of FIG. 1.

The roller for the pressure treatment of webs, according to the present invention, is characterized primarily in that the reinforcing inserts comprise a monofile coil which extends over the entire length of the roller mantle and is made of a metallic material or a very strong synthetic material, and furthermore comprises two layers arranged in radial direction above and below said coil composed of thread-shaped strength carriers rectilinearly extending substantially in axial direction over the entire length of the roller mantle, said strength carriers being spaced from each other and extending parallel to each other while being distributed over the roller circumference. The strength carriers may for instance be steel wires, or strands made up of steel wires, or cables. The said coil expediently has a relatively low pitch of a magnitude corresponding approximately to the diameter of the wire cross section and is on both sides covered against direct contact of the enclosing layers of thread-shaped strength carriers. This cover is effected by intermediate layers of elastomeric material.

The reinforcement according to the invention results in a surprising stiffness of the roller mantles in radial direction which stiffness makes such roller mantles particularly suitable for use as pressure means support. However, the invention is by no means limited thereto but can advantageously also be employed in connection with other roller constructions. While the reinforcement of covers of rubber or synthetic materials with rubber-like properties which comprise longitudinally extending strength carriers alone or with the provision of a plurality of layers could not fully meet the requirements in the field under consideration, and while the embedding of a wire coil was insufficiently dynamic in axial direction, it has been found that only the combination of two elements in the particular arrangement with regard to each other meets all the expectations to an optimum effect. As explanation for this favorable effect, it is assumed that the reinforcing coil which locally confines the roller mantle in radial planes and which statically stabilizes the reinforcing coil in view of the embedding between two axially oriented individual thread inserts is improved as to its bonding to the elastomeric mantle material and with regard to its dynamic behavior is greatly improved. The longitudinal threads or wires which cross the windings of the wire coil approximately at a right angle confine the relative movement of adjacent windings with regard to each other so that as a result thereof the pushing or shearing forces occurring in the binding zone are considerably reduced and consequently higher dynamic loads will be possible.

The manufacture of roller mantles according to the invention principally does not cause any difficulties but can be carried out in conformity with methods customary for the curving, for instance of similarly designed technical hoses. The cross sectional shape of the said coil may be as desired and as the case may be, in conformity with the prevailing aspects may be circular, square-shaped, or of any desired shape. The cross section of the longitudinal threads or wires will generally be only a fraction of the surface measurement of the wire coil. For the dynamic behavior of the reinforcing inserts as an entity within the complex build-up of the layers of the roller mantles according to the invention, it is advantageous when according to a further feature of the invention the rubber layer or the layer of synthetic material which is adjacent to the inner layer of the thread-shaped strength carrier and faces the roller core has a greater material hardness than the outer layer of rubber or rubber-like material.

Referring now to the drawing in detail, the illustration is primarily directed to illustrating the build-up of the roller mantle whereas the construction of the pertaining roller core and the support of the mantle by the latter may be selected at will and may be disregarded in connection with the present invention. The illustrated roller mantle which may be used for instance for deep print rotary machines comprises an inner layer 3 facing the roller core and made of a rubber with a shore hardness A of about 95°. The roller mantle furthermore comprises an outer layer 4 of rubber or rubber material which is considerably thicker than the inner layer 3 and has a shore hardness A of about 85° while a reinforcing insert layer is arranged therebetween. The reinforcing insert layer comprises 3 concentrically arranged elements namely a steel wire coil 5 and wire layers 6 and 7 which are arranged parallel to each other but are spaced from each other and extend in axial direction. In the illustrated embodiment the coil 4 is wound of square-shaped wire with a pitch corresponding to a lateral edge of the wire cross section and is completely embedded in the elastomeric material. At its outer and inner mantle, the coil is covered by thin rubber plates 6 each of which exclude direct contact of the wire windings with the longitudinal wires 6 and 7.

It is, of course, to be understood that the present invention is by no means, limited to the specific showing in the drawing, but also comprises any modifications within the scope of the appended claims.

What we claim is:

1. A roller for the pressure treatment of webs of goods, which comprises: a rigid roller core, a hose-shaped mantle of elastomeric material mounted on said core; and reinforcing inserts embedded in said mantle, said reinforcing inserts including a monofile coil of substantially non-extensible material extending over the length of said mantle, two layers of rectilinear thread-shaped strength carriers which extend substantially in the axial direction of the roller in mutually spaced parallel arrangement while being distributed in the circumferential direction of the roller and extending over the length of said roller and while being respectively located radially on opposite sides of said coil.

2. A roller according to claim 1, in which said monofile coil is of metal.

3. A roller according to claim 1, in which said monofile coil is of a strong synthetic material.

4. A roller according to claim 1, which includes elastomeric cover material arranged around said coil and between the latter and said two layers of rectilinear thread-shaped strength carriers.

5. A roller according to claim 1, in which said strength carriers are steel wires.

6. A roller according to claim 1, in which said strength carriers are strands of steel wires.

7. A roller according to claim 1, in which said strength carriers are steel cables.

8. A roller according to claim 1, in which said coil has a pitch corresponding to the cross section of a winding thereof.

9. A roller according to claim 1, in which said hose-shaped mantle of elastomeric material comprises an outer layer located radially outside said reinforcing inserts and also comprises an inner layer located radially inside said reinforcing inserts, and in which said inner layer has a greater shore hardness than said outer layer.

* * * * *